July 29, 1947.                    E. J. SADON                    2,424,922
                                    BRAKE
                        Filed Sept. 8, 1945            4 Sheets-Sheet 3

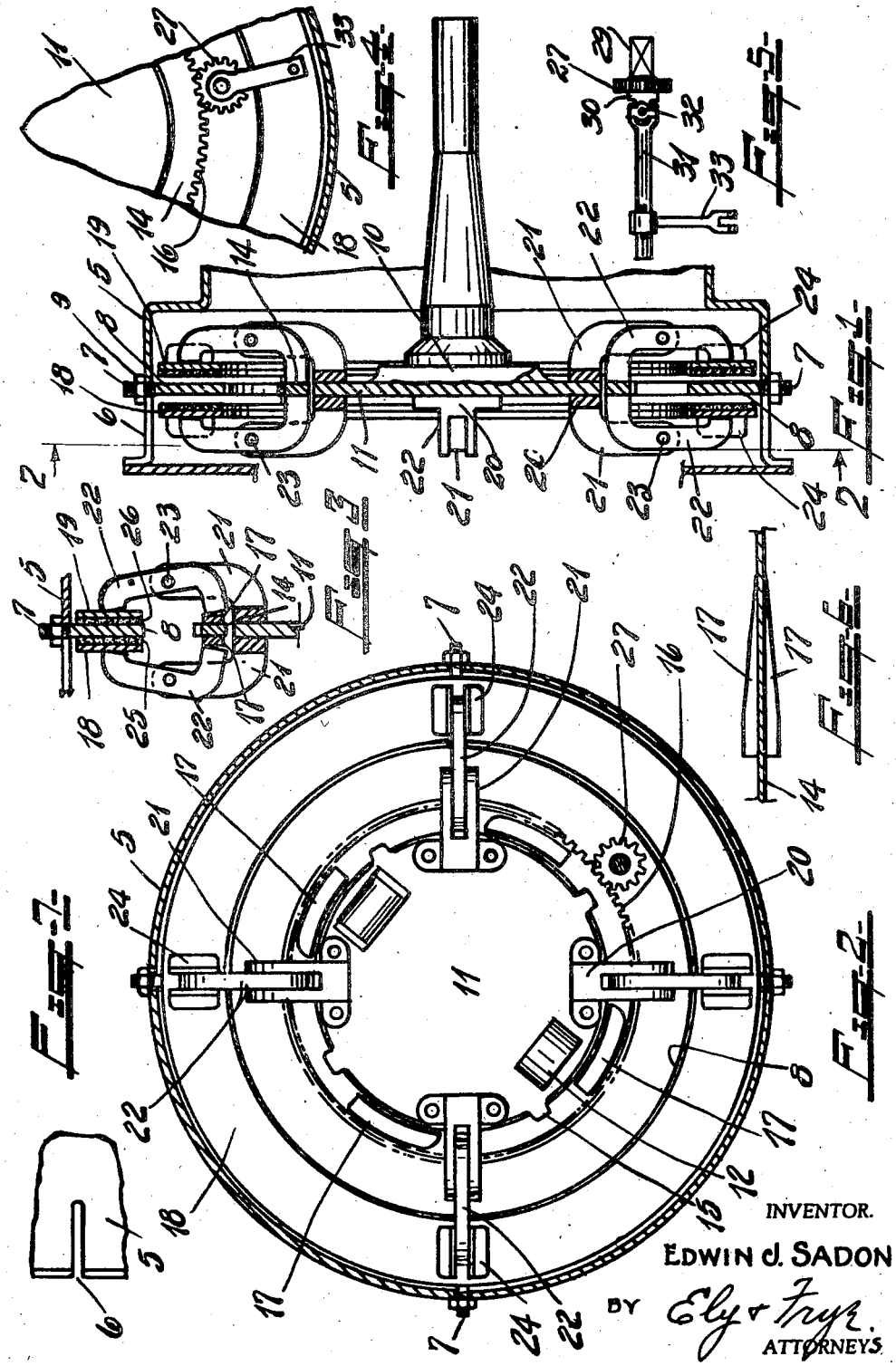

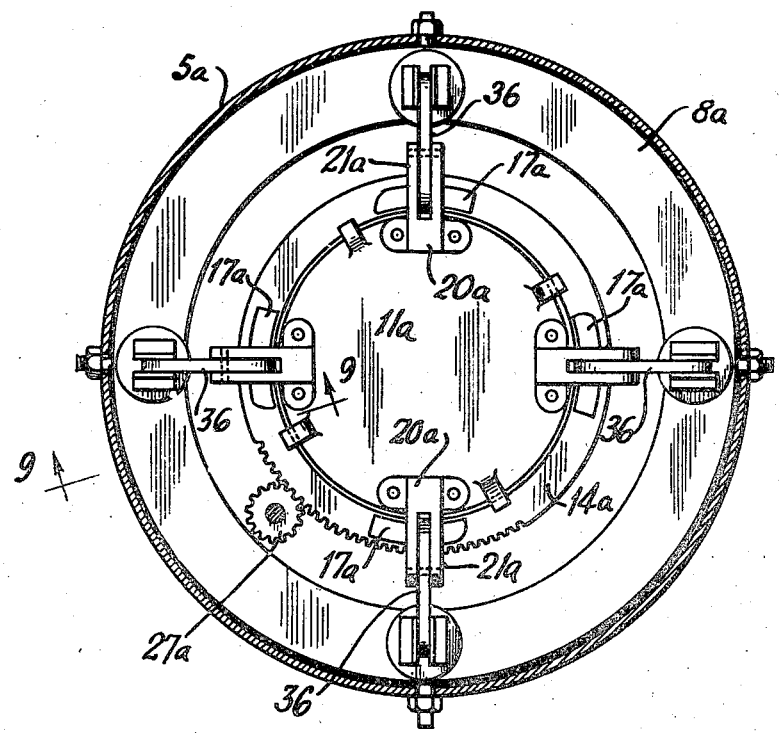
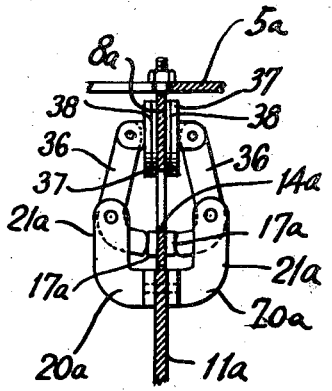

Fig-10-

INVENTOR
EDWIN J. SADON
BY Ely & Frye
ATTORNEYS

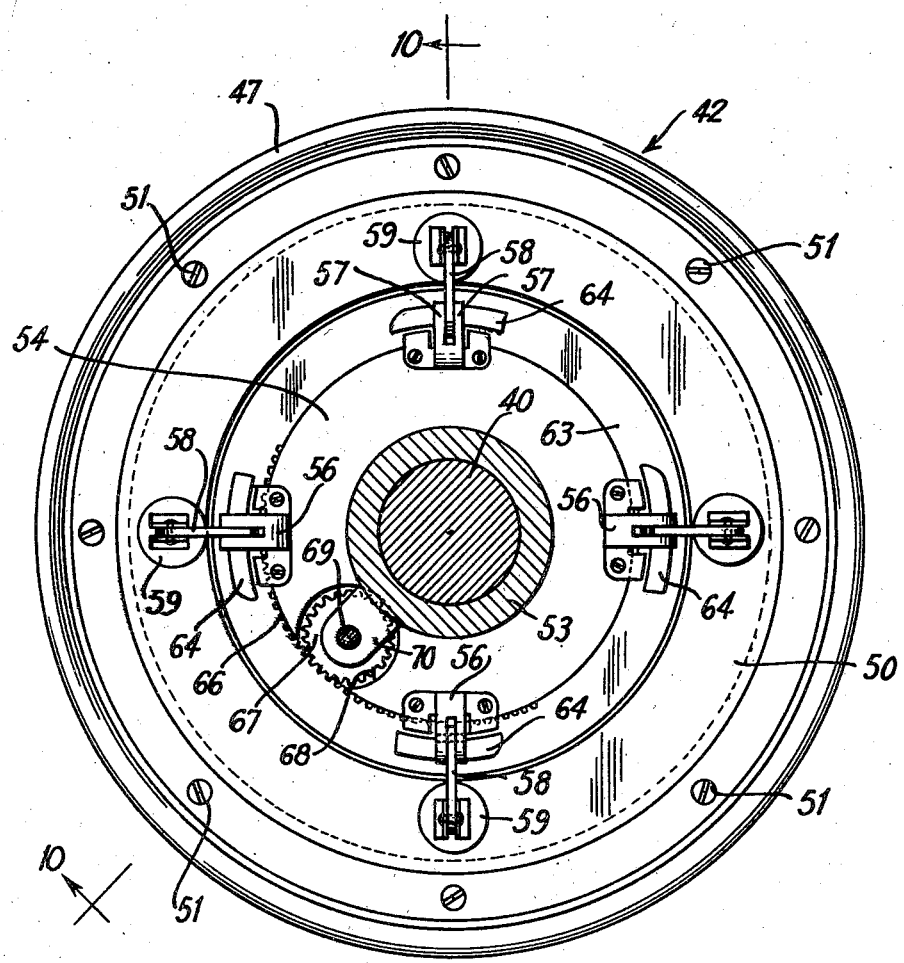

Patented July 29, 1947

2,424,922

UNITED STATES PATENT OFFICE 2,424,922

BRAKE

Edwin J. Sadon, Cuyahoga Falls, Ohio, assignor to The Firestone Tire & Rubber Company, Akron, Ohio, a corporation of Ohio Application September 8, 1945, Serial No. 615,158

3 Claims. (Cl. 188—73)

1

This invention relates to friction brakes of the disc type and more especially it relates to brakes adapted for use on automotive wheeled vehicles in general.

One of the chief objects of the invention is to provide a brake comprising a member or disc rotatable with a wheel, together with non-rotatable ring members on opposite sides thereof, and which are moved into facial contact therewith to effect the desired braking action.

Another object is to provide a friction type brake which is simple and compact in construction, which is not likely to get out of order, which readily can be assembled, and which can be economically manufactured.

A further object is to provide simple, practical and efficient wedge mechanism for shifting the outer ring members into engagement with the revolving disc member and provide simple and practical means for anchoring the revolving disc member to the wheel drum.

With the foregoing and other objects in view, the present invention consists in the combination and arrangement of parts, hereinafter more fully described, illustrated in the accompanying drawings, and particularly pointed out in the appended claims.

Of the accompanying drawings:

Fig. 1 is a vertical sectional view of a vehicle wheel showing the improved brake mechanism;

Fig. 2 is an inside face view thereof taken on the line 2—2 of Fig. 1;

Fig. 3 is a fragmentary sectional edge view showing the braking rings in applied position;

Fig. 4 is a fragmentary view similar to Fig. 2 showing the wedge ring rotating means;

Fig. 5 is a detail view of the pinion, pinion shaft and lever;

Fig. 6 is a part sectional edge view illustrating the wedges;

Fig. 7 is a fragmentary view of the brake drum, on a larger scale;

Fig. 8 is a view similar to Fig. 2 showing another embodiment of the invention;

Fig. 9 is a section on the line 9—9 of Fig. 8;

Fig. 10 is a diametric section on the line 10—10 of Fig. 11, showing an airplane wheel, and brake means constituting yet another embodiment of the invention operatively associated therewith; and Fig. 11 is a section on the line 11—11 of Fig. 10 showing the brake structure in elevation.

Referring first to Figs. 1 through 7 of the drawings, the numeral 5 designates a brake drum to which a wheel (not shown) is secured in the

2 conventional manner. This drum may be of any desired or required width and diameter and is formed with spaced apart transversely slotted openings 6 to accommodate bolts 7 which are welded to a disc member 8 that is mounted in and rotates with the drum, suitable nuts 9 being provided for tightening and securing said disc in position.

The wheel spindle 10 is of conventional design and terminates in a flat plate 11 that has bosses 12 formed integral therewith, and in which a king pin (not shown) is mounted. A wedge ring 14 surrounds the spindle plate 11 and is held in position by means of lugs 15 provided on the peripheral margin of said plate 11, the periphery of said ring 14 being toothed as shown at 16. A plurality of wedge shaped members 17 are welded or otherwise secured to ring 14 in spaced apart relation, said wedges being adapted to activate brake rings 18 and 19 in a manner that presently will be explained.

Brackets 20 are secured to the opposite sides of the plate 11 in spaced apart relation and are formed with outwardly projecting forked bar sections 21, disc actuating levers 22 being pivotally connected to the ends of said bar sections 21 at a point intermediate their length by means of pins 23 and are angular in shape, as shown, the inner ends of the legs of the levers engaging the wedge ring 14, the outer ends of the legs engaging the respective brake rings 18 and 19. Lugs 24 are provided on the outer face of each of the brake rings in pairs, the outer legs of the brake levers being disposed therebetween to support said rings and prevent rotation thereof when engaged with the rotating disc member 8. Asbestos facings or liners 25 and 26 respectively are secured to the inner or confronting faces of said rings by means of rivets (not shown). When the mechanism is in position shown in Fig. 3 of the drawings, the inner face of each ring 18 and 19 engages the disc member 8 to provide the usual braking action, the degree of braking action being determined by the rotation of the wedge ring, and the engagement of the inner end of the brake levers with the wedges 17.

The wedge ring is rotated, of course, when a vehicle brake pedal (not shown) is actuated, and to this end there is provided a spur gear 27 that meshes with the toothed edge 16 of the ring 14, said gear having an axial shaft section (not shown) extending from one side thereof and journaled in a bearing 29 provided on the spindle. On the opposite side of the gear 27 is an integral shaft section 30, and a shaft 31 is connected thereto by means of a conventional universal joint 32. A hanger 33 is mounted on the end of shaft 31, and a brake rod (not shown) is pivotally secured thereto. It will be apparent that when the brake lever is actuated, the wedge ring will be rotated accordingly to bring the ends of the wedges 17 into engagement with the inner end of the levers 22. Continued rotation forces the outer ends of the levers inwardly with the result that the brake rings 18 and 19 are moved into operative engagement with the disc member 8.

From the foregoing description it will be apparent that the invention provides a simple, practical, and economical brake for use on automotive vehicles in general, and achieves the other objects set out in the foregoing statement of objects.

Referring now to Figs. 8 and 9 of the drawings, there is shown a brake structure that is essentially similar to that previously described, and differs therefrom only in the construction of the members that carry the brake lining into engagement with the rotatable disc member. Thus the brake drum 5a, disc member 8a, spindle plate 11a, wedge ring 14a, wedges 17a, brackets 20a and gear 27a are all identical with similarly designated elements of the previously described embodiment of the invention. The brackets 20a are mounted in pairs on opposite sides of spindle plate 11a, each bracket comprising a pair of arms 21a between which an angular lever member 36 is positioned, said lever being pivotally supported in the outer ends of said arms. The lever members 36 are disposed radially of the device, their innermost end portion extending laterally toward the wedge ring 14a, and adapted for engagement with respective wedges 17a, the latter being adapted to swing the levers on their pivots so that the outer ends thereof move toward the disc member 8a. Pivotally carried on the outer ends of said levers 36 are respective metal discs or brake shoes 37, and secured to each of the latter, on the face thereof that confronts the disc member 8a is a facing 38 of friction material such as brake lining.

This embodiment of the invention functions in exactly the same manner as that first described, but since it has a smaller area of brake lining its use is limited to lighter loads.

An embodiment of the invention is shown in Figs. 10 and 11 of the drawings in its application to the landing wheels of airplanes. Shown therein is a wheel spindle or axle 40 that carries bearings 41, 41, and supported upon the latter is a landing wheel that is designated as a whole by the numeral 42. The latter is a separable structure comprising an axial hub 43, and wheel portions 44, 45 that abut each other in the central plane of the wheel, the said wheel elements being retained in assembled relation by a plurality of bolt-like members 46. The wheel portions 44, 45 are formed with end-flanges 47, 48 respectively that retain a tire (not shown) upon the wheel. The flange 48, which is at the outer end of the wheel, has a suitable hub cap 49 mounted thereon. The flange 47 at the opposite end of the wheel has an annular brake disc 50 mounted thereon, said disc being Z-shape in section, as shown, so as to stand in spaced relation to the end of the wheel, said disc being secured to the flange 47 by screws 51. Preferably the screw-holes in the flange 47 are countersunk, and the area about each screw-hole in the brake disc is complementally deformed or embossed so as to fit within said countersinks, the arrangement being such as to relieve the screws 51 of much of the shearing strain arising as the result of torque set up in the brake disc during braking operations.

Mounted upon the axle 40, in abutting relation to the bearing 41 thereon, is a bracket 53, said bracket formed with a radially extending flange 54 that is disposed in the same plane as the operative portion of the brake disc 50. The bracket 53 is fixedly secured to the axle 40 in any suitable manner, for example, by means of a set screw 55. Mounted in pairs, upon opposite lateral faces of the flange 54, at the perimeter thereof, are brackets 56, 56, each of which comprises a pair of arms 57, 57 that extend radially outwardly, and at their free ends have an angular lever member 58 journaled therein. A portion of each lever member 58 extends radially outwardly to a point disposed laterally of the brake disc 50, and pivotally carried at the outer end of such portion is a metal disc or brake shoe 59 that has a facing of friction material 60 on the side thereof that confronts said disc 50.

For urging the brake shoes 59 toward the brake drum, the opposite end portion of each lever member 58 extends laterally toward an annular wedge ring 63 that is journaled upon the periphery of the flange 54, between the latter and the inner circumference of the brake disc 50. Portions of each bracket 56 extend beyond the periphery of the flange 54 to retain the wedge ring 63 in place. The wedge ring 63 is formed at circumferentially spaced points with laterally projecting wedge formations 64, 64 that are adapted, upon rotary movement of the wedge ring, to engage the inner ends of the lever members 58, and, by swinging the latter about their pivots, to move the brake shoes 59 into operative engagement with the brake drum.

For turning the wedge ring angularly as described, the inner circumferential margin of the ring is locally formed with gear teeth 66, and the latter are meshed with a gear 67, the flange 54 being cut away at 68, Fig. 11, to admit said gear. The gear 67 is mounted upon one end of a rock-shaft 69 that is journaled in a suitable bearing 70 formed on the bracket 53. The other end of rock-shaft 69 has an operating lever 71 mounted thereon and adapted for connection with the usual brake rod (not shown). It will be apparent that oscillation of rock-shaft 69 will produce a braking action similar to that achieved in the previously described embodiments of the invention. The braking mechanism may be protected by a metal cover secured to the brake disc 50, said cover being shown in broken lines in Fig. 10, and designated 73.

Other modification may be resorted to without departing from the spirit of the invention, or the scope thereof as defined by the appended claims.

What is claimed is:

1. The combination with a wheel spindle, of a toothed ring member having wedges thereon in spaced apart relation, a brake drum, a disc ring removably mounted thereon and rotatable therewith, friction discs on opposite sides of said disc ring, brackets mounted on the spindle and provided with projecting forked sections, levers pivotally mounted on said forked sections, means whereby said friction discs are supported solely by said levers at one end thereof, and means for rotating said ring gear to bring the wedges into engagement with the other ends of said levers to force the friction discs into frictional engagement with the disc ring.

2. The combination with a wheel spindle, of a wedge ring having inclined wedges thereon in spaced apart relation, a brake drum, a ring disc thereon and rotatable therewith, friction discs on opposite sides of said ring disc, forked brackets on the spindle, angular shaped radially disposed levers pivotally mounted thereon with their outer ends in engagement with and supporting said friction discs, and means for rotating said wedge ring to bring the wedges into engagement with the inner ends of said levers to shift the friction discs into frictional contact with the disc member.

3. The combination with a wheel spindle, of a ring gear having wedge formations thereon in circumferentially spaced apart relation, a rotatable brake drum having a disc-like brake-engaging portion rotatable therewith, friction discs on opposite sides of the latter, forked brackets supported by the spindle, angular shaped levers pivotally mounted on respective brackets with their outer ends pivotally connected to said friction discs so as to support the latter, and means for rotating said ring gear to move the wedges into operative engagement with the inner ends of said levers to force the friction discs into frictional engagement with the disc-like portion of the brake drum.

EDWIN J. SADON.

REFERENCES CITED

The following references are of record in the file of this patent:

UNITED STATES PATENTS

| Number | Name | Date |
|---|---|---|
| 2,009,703 | Pecker | July 30, 1935 |
| 2,115,083 | Pierce | Apr. 26, 1938 |